US005909262A

United States Patent [19]

Tomooka et al.

[11] Patent Number: 5,909,262

[45] Date of Patent: Jun. 1, 1999

[54] SEMICONDUCTOR DEVICE AND DRIVING METHOD FOR SEMICONDUCTOR DEVICE

[75] Inventors: Takatoshi Tomooka, Shiga-ken; Tetsuya Nogami, Ohmihachiman, both of Japan

[73] Assignee: International Business Machines Corporation, Armonk, N.Y.

[21] Appl. No.: 08/772,791

[22] Filed: Dec. 24, 1996

[30] Foreign Application Priority Data

Feb. 5, 1996 [JP] Japan .................................... 8-019138

[51] Int. Cl.[6] .................................................. G02F 1/1343

[52] U.S. Cl. ................................................ 349/39; 349/38

[58] Field of Search ......................................... 349/39, 38

[56] References Cited

U.S. PATENT DOCUMENTS 4,021,788 5/1977 Marr ........................................ 340/173

4,393,380 7/1983 Hosokawa et al. ..................... 340/805

5,191,322 3/1993 Katayama et al. ...................... 340/783

5,369,512 11/1994 Yanai et al. .............................. 359/59

*Primary Examiner*—William L. Sikes

*Assistant Examiner*—Tarifur R. Chowdhury

*Attorney, Agent, or Firm*—James E. Murray

[57] ABSTRACT

A liquid crystal display cell includes a voltage amplification function therein for driving the cell with an AC voltage. The cell includes gate lines running in a first direction, a source line running in a second direction different from the first direction, a switching means which is turned on and off by a voltage applied to a first gate line so as to supply a voltage from the source line, a fixed capacitance capacitor is connected to the source line via said switching means, and a variable capacitance capacitor is connected to the source line via said switching means in parallel to said constant capacitor. The variable capacitor is connected to a second gate line which is independent of the first gate line, and the capacitance of the variable capacitor changes according to the voltage applied thereto through a second gate line.

14 Claims, 9 Drawing Sheets

SEMICONDUCTOR DEVICE AND DRIVING METHOD FOR SEMICONDUCTOR DEVICE

FIELD OF THE INVENTION

The subject invention relates to a method for driving a liquid crystal display (LCD) panel and to a pixel having a structure which supports the driving method. In addition, the subject invention relates to a cell for a reflector LCD which is formed on a semiconductor substrate.

BACKGROUND ART

An LCD is a display apparatus in which polarized liquid crystal, a macromolecule substance, is sealed in between two transparent electrodes. Information is displayed on the LCD by applying a desired voltage between the two electrodes to change the orientation of the liquid crystal molecules according to the applied voltage to control the light transmittance between the electrodes on a pixel basis. To fabricate an LCD, therefore, a pixel part which consists of transparent electrodes and liquid crystal sealed therebetween as well as a driver for controlling the voltage to be applied to the pixel are required.

FIG. 1 shows an equivalent circuit of an LCD. The liquid crystal sandwiched between two electrodes is represented as a pixel capacitor 1. In many cases, an auxiliary capacitor 9 is formed on a panel in order to provide sufficient capacitance. The auxiliary capacitor 9 has a constant capacitance. The pixel capacitor 1 and the auxiliary capacitor 9 are connected to a switching transistor 2 which is driven by a gate line 3. The source electrode of the switching transistor is connected to a source line 4. An address is assigned to the gate line 3 and the source line 4, respectively. When the address (Sm, Gn) is specified, the voltage on the source line 4 is provided to the pixel capacitor 1 which consists of two electrodes and liquid crystal sealed in between them, and the auxiliary capacitor 9 described above through the switching transistor 2 which is driven by the gate line 3. This voltage causes the orientation of the liquid crystal molecules to change to control light transmittance. An electrode which is opposed to a pixel electrode 5 is commonly called the "counter electrode" 6.

In general, the tilt angle of liquid crystal molecules is roughly proportional to an applied voltage. In recent years, as the display quality has been refined, eight or 16 levels of voltage are applied, instead of simple two levels, and the different brightness levels are represented according to the different voltage levels. That is, the voltage applied to the source line is not constant. Instead, the voltage varies according to data which is to be displayed by a particular pixel.

The alignment of the liquid crystal molecules may be caused by applying a dc voltage to them. However, it is known that the liquid crystal sealed in the cell deteriorates in a very short time or is burnt if a dc voltage is applied. To apply a level of voltage to the liquid crystal cell, therefore, an ac voltage is generally used. That is, usually, voltages which have the same absolute value and opposite polarity and corresponds to certain gray scale are applied alternately in order to display gray scale.

There are two types of such a driving method using an alternating voltage which are conventionally used. The first method uses a high voltage driver. This method applies a potential to the pixel electrode by using an alternating voltage while retaining the voltage applied to the counter electrode at a constant level, as shown in FIG. 2. The potential applied to the cell is high, typically between 10 and 20V. This method presents a number of problems in terms of manufacturability. For example, it is difficult to develop a driver which achieves both a high voltage and high speed. Furthermore, it is not easy to integrate a high voltage circuit which provides multiple levels of output. The second method, as shown in FIG. 3, applies a relatively low voltage (about 5V) to the pixel electrode while applying a high alternating voltage to the counter electrode, and combines these voltages applied to the pixel and the counter electrode in order to achieve an alternating voltage drive effect. This method, however, requires that the counter electrode with large load be driven by a high alternating voltage, thus, the power consumption of the LCD panel is very large. Furthermore, this method is not practical because, as the pixel size becomes smaller, it is difficult to include wiring for driving the counter electrode by alternating voltage, especially in the case where an auxiliary capacitor 9 is included in the cell.

As described above, although the counter electrode potential may be maintained at a constant level using a high voltage driver, it is difficult to achieve high speed using such a driver, and such a driver is costly. If a low withstand voltage driver is used, an alternating voltage must be applied to the counter electrode in order to accomplish alternative driving of the cell. The application of this voltage will consume more electric power and increase the complexity of wiring, and the complex wiring will increase the cost. Therefore, it is desirable to overcome these disadvantages.

OBJECTS OF THE INVENTION

It is an object of the subject invention to AC drive a liquid crystal cell with sufficient potential by using a low withstand voltage driver while maintaining the counter electrode voltage at a constant level.

It is another object of the subject invention to provide a pixel which has a voltage amplification function in order to achieve the above-mentioned object.

It is a further object of the subject invention to provide a method for driving a pixel which includes a voltage amplification function.

It is an object of the subject invention to use a semiconductor device having such new features in other applications.

SUMMARY OF THE INVENTION

These objects of the subject invention are obtained through use of a liquid crystal display cell that includes an amplification function. The cell includes gate lines running in a first direction, a source line running in a second direction different from the first direction, a switching means which is turned on and off by a voltage applied to a first gate line so as to supply a voltage from the source line to the cell, a constant capacitor (the pixel capacitor in the liquid crystal cell) connected to the source line via said switching means, and a variable capacitor connected to the source line via said switching means in a manner parallel to said constant capacitor; wherein, said variable capacitor is connected to a second gate line which is a voltage applying means independent of said first gate line and said source line so that the capacitance of said variable capacitor can be varied in accordance with the voltage applied thereto.

An input voltage is amplified within such a liquid crystal display cell using the following steps:

(1) after the variable capacitor is set to a first value by applying a first voltage thereto, turning on the switching device to supply a voltage from the source line to the constant capacitor and the variable capacitor;

(2) turning off the switching device; and (3) applying a second voltage to the variable capacitor to set its capacitance to a second value which is lower than the first value.

BRIEF DESCRIPTION OF THE DRAWINGS

The above and other objects, features and advantages of the present invention can be best understood by reading the following detailed description while referring to the attached drawings of which.

DETAILED DESCRIPTION

Figure 4:
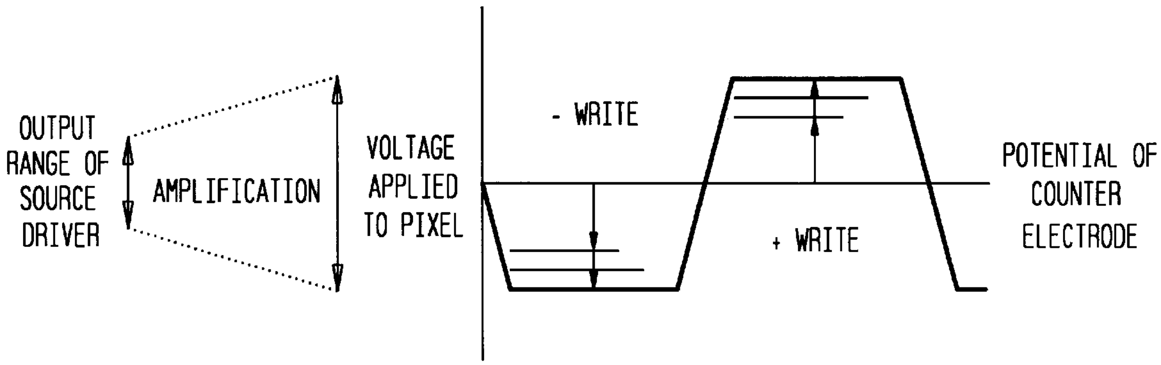
FIG. 4 is a conceptual view of a driving system according to the subject invention.

FIG. 4 shows the principle of the subject invention. The subject invention uses a source driver which has a relatively low withstand voltage and amplifies the driving potential of the source driver by a voltage amplification function included in the liquid crystal cell. As a result, a voltage condition similar to the voltage condition which would be achieved using a high voltage source driver is applied to the liquid crystal cell. The counter electrode potential may remain at a constant level, because the voltage is amplified by the amplification function included in the liquid crystal cell.

Figure 1:
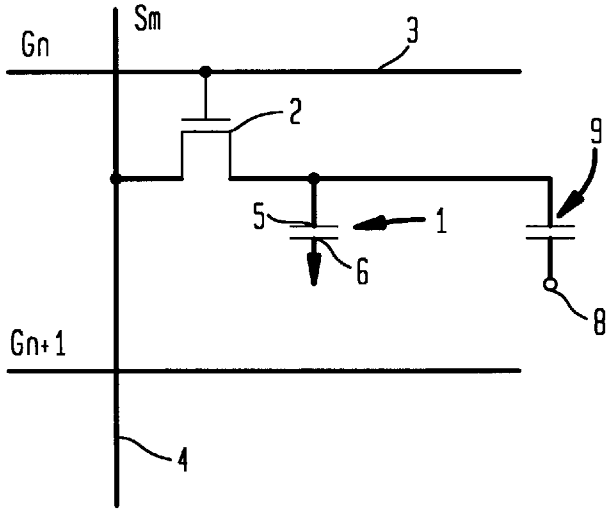
FIG. 1 is an equivalent circuit diagram of a liquid crystal cell and its driving system in accordance with the background art.
Figure 2:
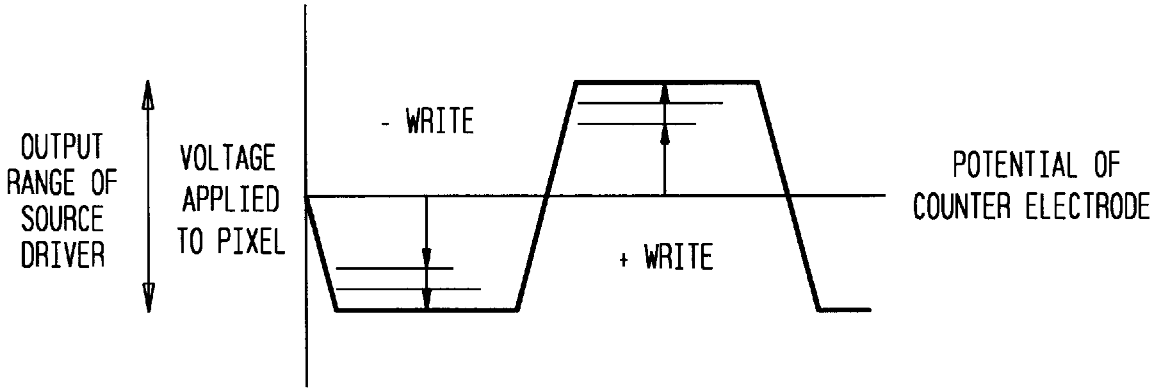
FIG. 2 shows an example of a driving method of the background art.
Figure 3:
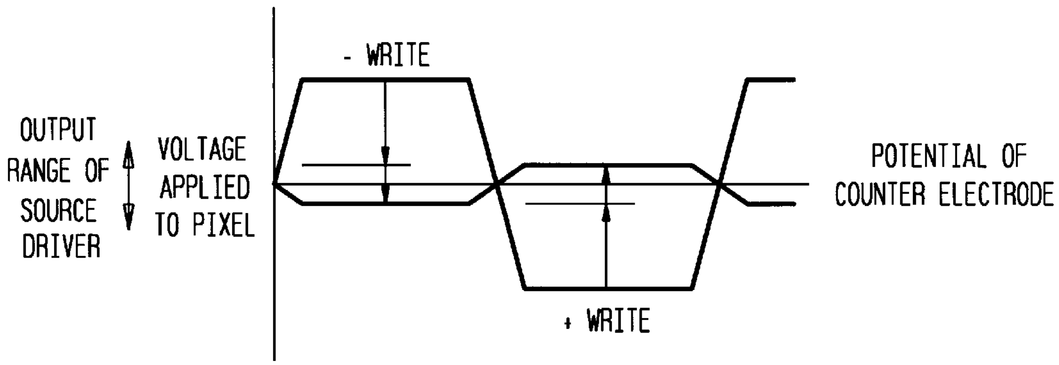
FIG. 3 shows another example of a driving method of the background art.
Figure 5:
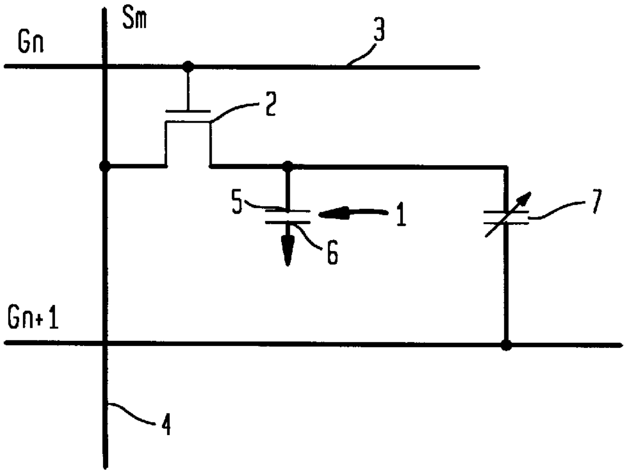
FIG. 5 is an equivalent circuit diagram of a liquid crystal cell and its driving circuit according to the present invention.
Figure 6:
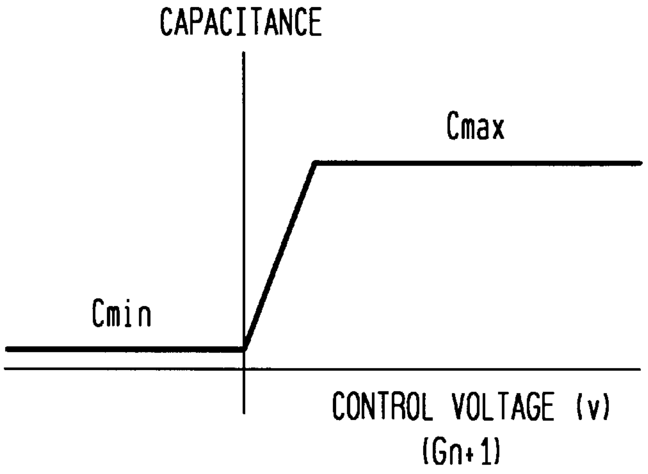
FIG. 6 is a voltage-capacitance characteristic diagram of a variable capacitor used in a liquid crystal cell according to the subject invention.

FIG. 5 shows a liquid crystal cell according to the subject invention. The difference of the cell from the background art cell (in FIG. 1) is in that a variable capacitance 7 is arranged in parallel with a pixel capacitor 1. The capacitance of the variable capacitor 7 varies in a step form as shown in FIG. 6, depending on a voltage applied to one electrode thereof. The other electrode of the variable capacitor 7 is connected to a gate line $G_{n+1}$ next to the gate line $G_n$ to which a gate of a switching transistor 2 is connected. The capacitance of the variable capacitor depends on the potential of the gate line $G_{n+1}$. By connecting the variable capacitor 7 to the pixel capacitor in this way, a driving voltage to be applied to the pixel capacitor can be amplified.

The operation of the liquid crystal cell with this novel 30 structure will be described below.

Figure 7:
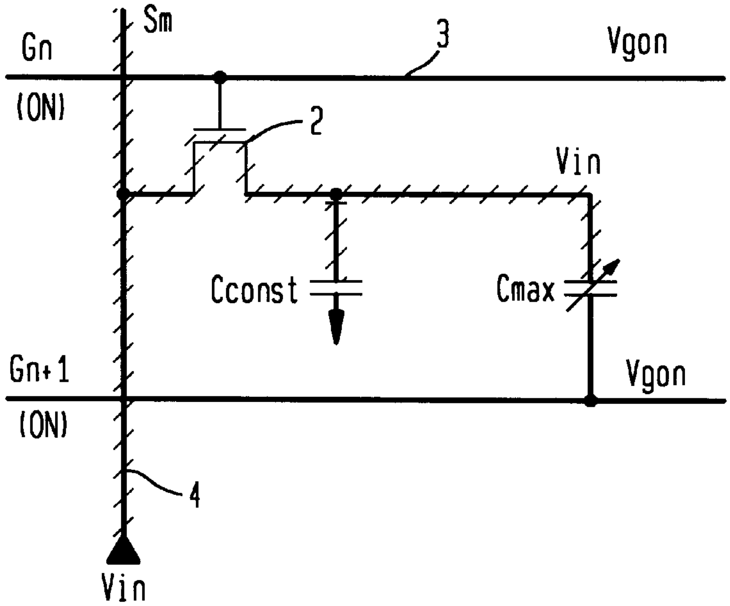
FIG. 7 is a diagram used for explaining the operation of the liquid crystal cell and its driving circuit according to the subject invention.

(1) First, a voltage Vg is applied to the gate line $G_{n+1}$ ($V_{gon}$), as shown in FIG. 7. Then the capacitance $C_{var}$ of the variable capacitor 7 becomes the maximum value $C_{max}$ as shown in FIG. 6.

(2) In this state, the switching transistor 2 is turned on by applying a voltage Vg to the gate line $G_n$ ($V_{gon}$), so that the voltage applied to the source is coupled to the pixel capacitor 1 and to the variable capacitor 7 in parallel. At this point, the sum $Q_{pixel}$ of charge held in the pixel capacitor 1 and the variable capacitor 7 is expressed by the following equation:

[Equation 1]

$$Q_{PIXEL}=C_{CONST}\cdot V_{IN}+C_{MAX}\cdot(V_{IN}-V_{GON})$$

where, $C_{const}$ is the capacitance value (constant) of the pixel capacitor and $V_{in}$ is the potential of the source line.

Figure 8:
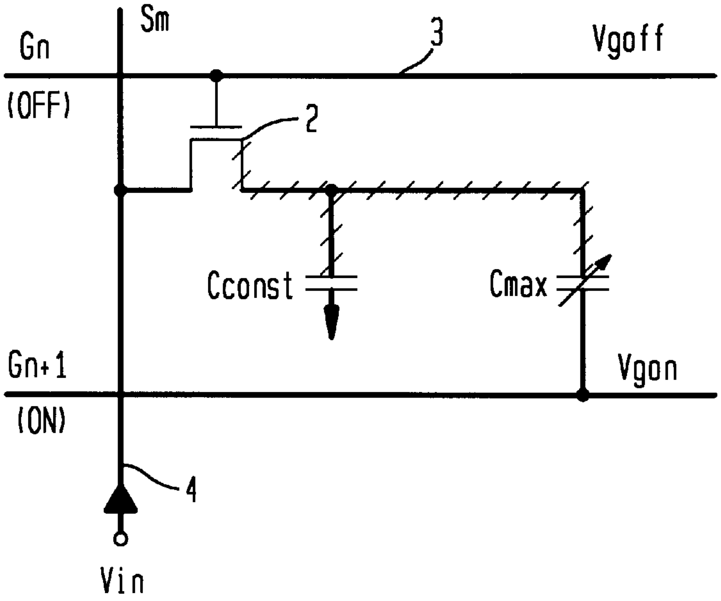
FIG. 8 is a diagram used for explaining the operation of the liquid crystal cell and its driving circuit according to the subject invention.

(3) In this state, the potential of the gate line $G_n$ is lowered as shown in FIG. 8 to turn off the switching transistor 2. In this point, the gate line $G_{n+1}$ is maintained at a high potential. Thus, the sum $Q_{pixel}$ of charge stored in the pixel capacitor 1 and the variable capacitor 7 is unchanged.

Figure 9:
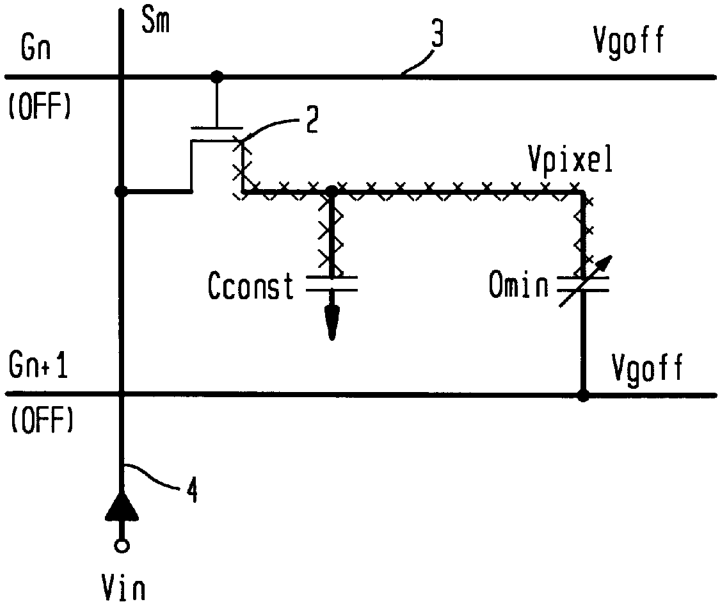
FIG. 9 is a diagram used for explaining the operation of the liquid crystal cell and its driving circuit according to the subject invention.

(4) Next, the potential of the gate line $G_{n+1}$ is lowered to near zero ($V_{goff}$) as shown in FIG. 9. As the potential is lowered, the capacitance $C_{var}$ of the variable capacitor 7 is reduced to $C_{min}$ (See FIG. 6). However, $Q_{pixel}$ is retained at a constant level because the entire circuit is turned off. That is, variations in the variable capacitance appears as changes. The charge $Q_{pixel}$ held at this point of time is expressed by the following equation:

[Equation 2]

$$Q_{PIXEL}=C_{CONST}\cdot V_{PIXEL}+C_{MIN}\cdot(V_{PIXEL}-V_{GOFF})$$

where, $V_{pixel}$ is a voltage applied to the pixel capacitor.

Value $V_{pixel}$ is given by Equation 1 and Equation 2. The resulting value is expressed by the following equation:

$$V_{PIXEL}=\frac{C_{CONST}+C_{MAX}}{C_{CONST}+C_{MIN}}\cdot V_{IN}+\frac{1}{C_{CONST}+C_{MIN}}\cdot(C_{MIN}\cdot V_{GOFF}-C_{MAX}\cdot V_{GON})$$

In this way, according to the subject invention, a voltage $V_{in}$ applied to the source line would be amplified to $V_{pixel}$ by the function of the variable capacitor arranged in parallel with the pixel capacitor. Thus, the liquid crystal cell can be driven with a sufficient potential by using a low withstand voltage source driver.

The amplification factor of the liquid crystal cell used for the subject invention will be considered below. In Equation 3, let the lowest and highest voltages within a write voltage range be $V_{inl}$ and $V_{inh}$, respectively, and the lowest and highest voltages within a held voltage range be $V_{outl}$ and $V_{outh}$, respectively. $V_{outl}$ and $V_{outh}$ are given by the following equations, respectively:

$$V_{OUTH} = \frac{C_{CONST} + C_{MAX}}{C_{CONST} + C_{MIN}} \cdot V_{INH} + \frac{1}{C_{CONST} + C_{MIN}} \cdot (C_{MIN} \cdot V_{GOFF} - C_{MAX} \cdot V_{GON}) \quad \text{[Equation 4]}$$

$$V_{OUTL} = \frac{C_{CONST} + C_{MAX}}{C_{CONST} + C_{MIN}} \cdot V_{INL} + \frac{1}{C_{CONST} + C_{MIN}} \cdot (C_{MIN} \cdot V_{GOFF} - C_{MAX} \cdot V_{GON}) \quad \text{[Equation 5]}$$

The swing of the voltage applied to the pixel capacitor, $V_{swing}=V_{outh}-V_{outl}$, is expressed by:

$$V_{SWING} = V_{OUTH} - V_{OUTL} = \frac{C_{CONST} + C_{MAX}}{C_{CONST} + C_{MIN}} \cdot (V_{INH} - V_{INL}) \quad \text{[Equation6]}$$

Thus the amplification factor $\lambda=(V_{outh}-V_{outl})/(V_{inh}-V_{inl})$ is given by:

$$\frac{V_{OUTH} - V_{OUTL}}{V_{INH} + V_{INL}} = \frac{C_{CONST} + C_{MAX}}{C_{CONST} + C_{MIN}} \quad \text{[Equation7]}$$

The technology for forming the liquid crystal cell according to the subject invention will be described below. It is desirable that the liquid crystal cell of the subject invention is formed on a semiconductor substrate, because a variable capacitor is more easily constructed by forming the liquid crystal cell on a semiconductor substrate than other implementations. Theoretically, the capacitor which constitutes a cell structure having the above-mentioned amplification function may be any of various types of capacitors. For example, as a voltage independent capacitor, (1) a capacitor between parallel electrodes isolated by layer insulation film, (2) a capacitor between a diffusion area and a substrate, and (3) a capacitor (pixel capacitor) between electrodes isolated by liquid crystal may be used. As a capacitor which causes changes in capacitance on a substrate made of a semiconductor such as silicon, (1) a capacitor between a gate and the source of an N channel FET (drain), (2) between a gate and a p-type substrate, (3) a capacitor between n-type diffusion area and p-type substrate, and (4) a capacitor between n-well and p-type substrate may be used.

Figure 10:
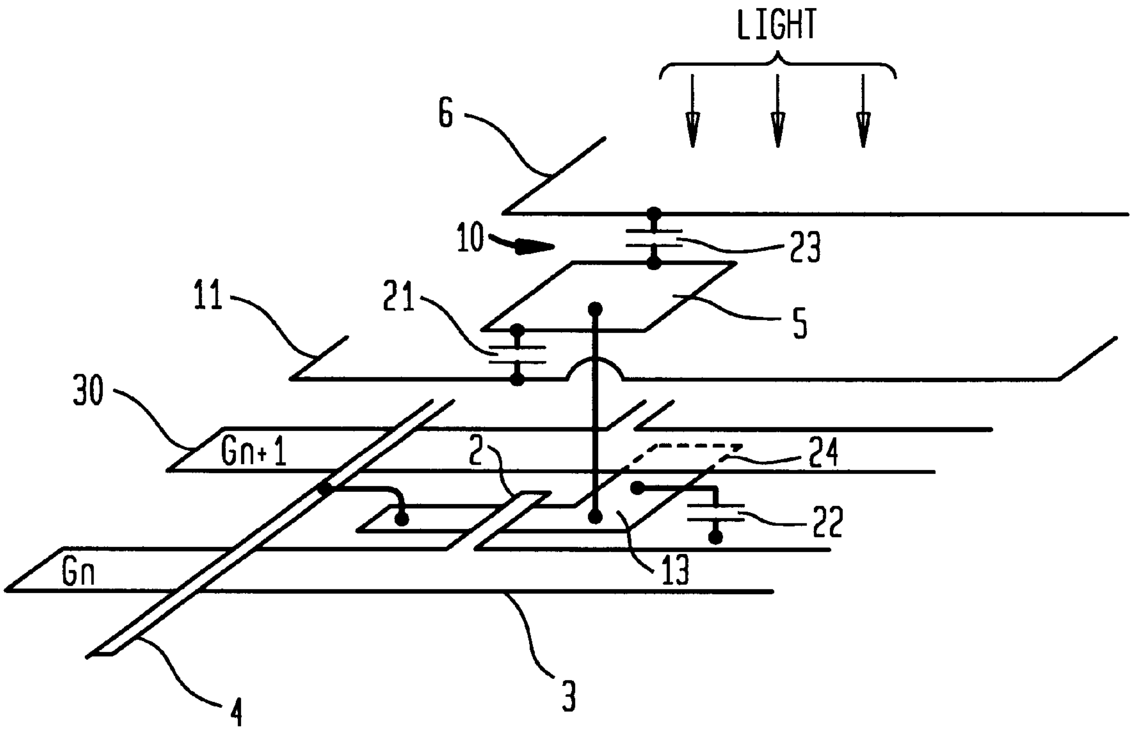
FIG. 10 is a bird's eye view of the liquid crystal cell and its driving circuit according to the subject invention.

FIG. 10 shows a bird's eye view of the concept of a voltage-independent capacitor. FIG. 10 generally corresponds to FIG. 1 which shows an equivalent circuit. As shown in FIG. 10, a counter electrode 6 is transparent and light projected onto it is passed through it. Some of the light is blocked by liquid crystal 10 and reflected by a light shield plate 11. The orientation of the liquid crystal molecules are controlled by a pixel electrode 5. The pixel electrode 5 is connected to a wiring layer 13 which is connected to a source line 4 via a switching transistor 2 as shown, thus a voltage from the source line 4 can be applied to the pixel electrode. Gate lines 3 and 30 are arranged in parallel and connected to a gate of the switching transistor 2. The source line 4 is connected to a wiring layer which forms the switching transistor 2, and applies a predetermined voltage to it. In this figure, the voltage-independent capacitors are indicated by reference numbers 21 to 23, which are, (1) a capacitor 21 between parallel electrodes isolated by layer insulation film, (2) a capacitor 22 between a diffusion area and a substrate, and (3) a capacitor 23 (pixel capacitor) between electrodes isolated by liquid crystal. During operation, all the capacitors act as voltage-independent capacitors.

Figure 11:
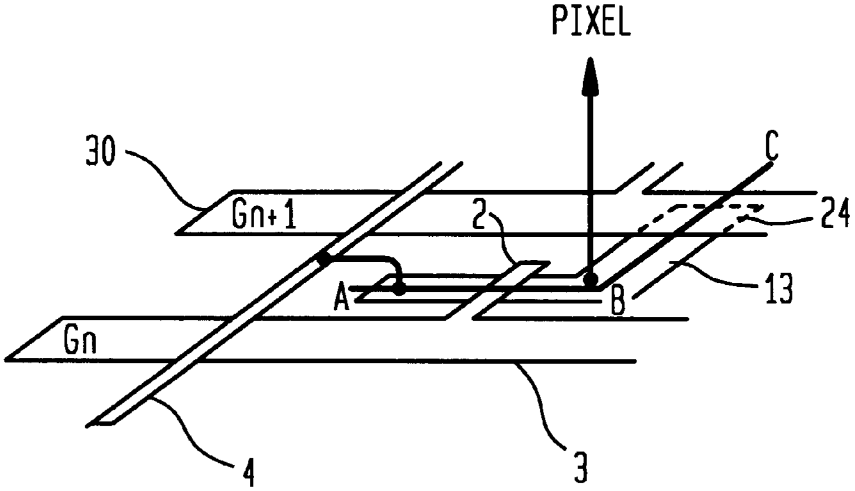
FIG. 11 is a bird's eye view of the liquid crystal cell and its driving circuit according to the subject invention.
Figure 12:
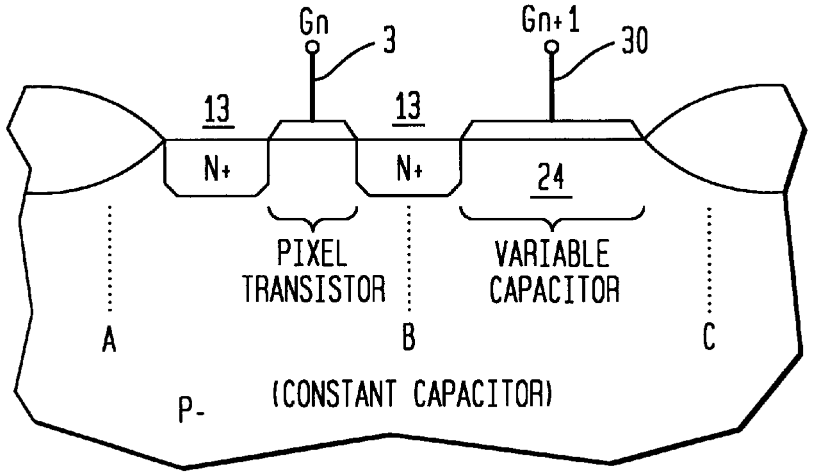
FIG. 12 is a cross-sectional view of the liquid crystal cell and its driving circuit according to the subject invention.

FIG. 11 shows a voltage-dependent capacitor. In this figure, (1) a capacitor between a gate and the source of an N channel FET (drain) is disclosed as a variable capacitor. The capacitor is an ion-undoped part 24 formed below a gate line $G_{n1}$ 30 which is one line next to a gate line $G_n$ 3. A cross section along the line A-B-C in FIG. 11 is shown in FIG. 12. An N-doped part 13 is formed in the P type semiconductor substrate. The relationship among the switching transistor, the variable capacitor, and the gate line is shown in this figure.

Figure 13:
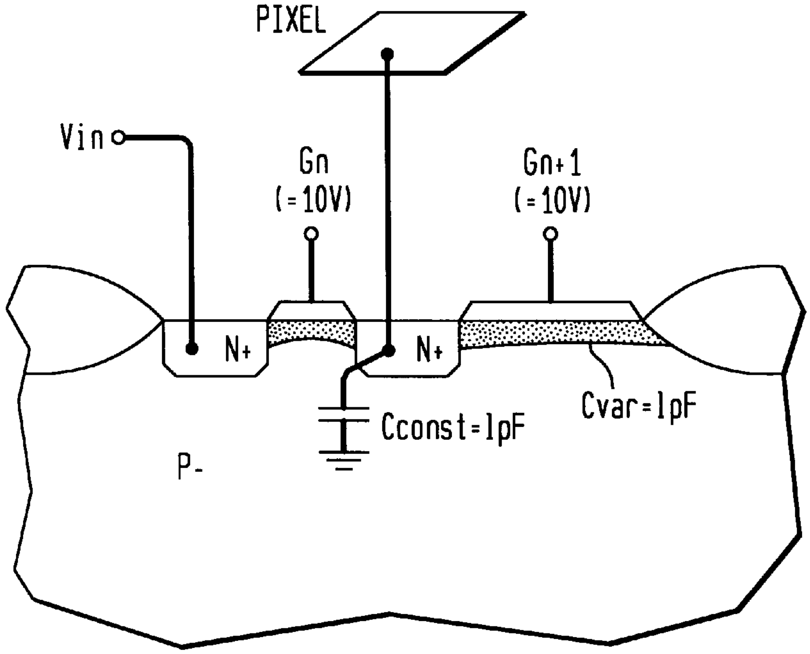
FIG. 13 is a cross-sectional view of the liquid crystal cell and its driving circuit according to the subject invention which is used for explaining the operation.
Figure 14:
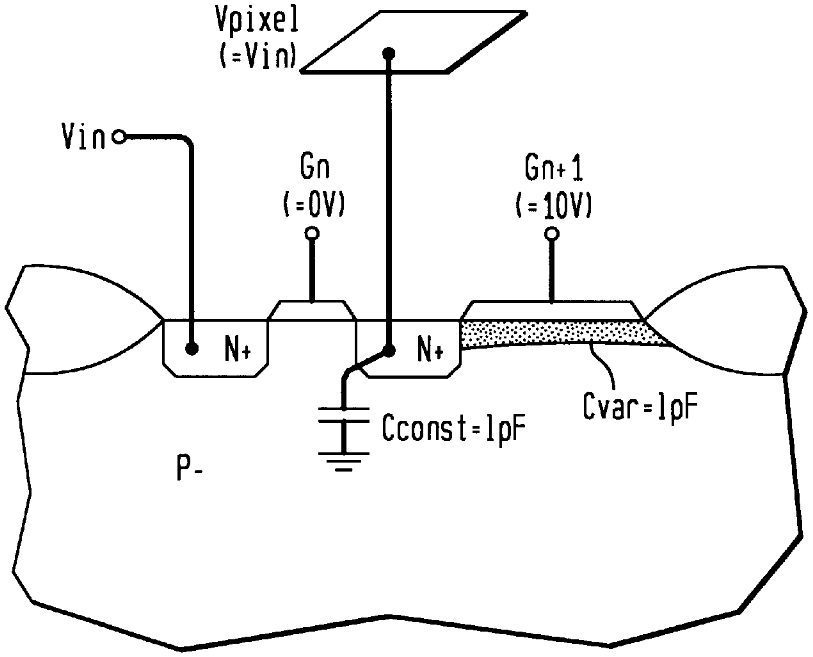
FIG. 14 is a cross-sectional view of the liquid crystal cell and its driving circuit according to the subject invention which is used for explaining the operation.
Figure 15:
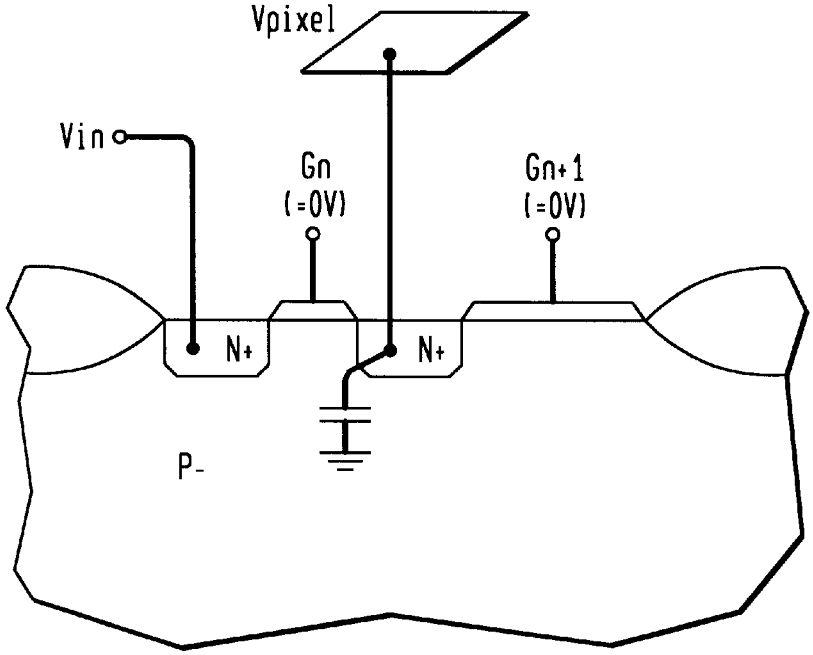
FIG. 15 is a cross-sectional view of the liquid crystal cell and its driving circuit according to the subject invention which is used for explaining the operation.

The novel operation of a semiconductor which has the above-mentioned structure is shown in FIGS. 13 to 15. This operation amplifies a voltage which drives the liquid crystal cell. This operation is the same as described with reference to the schematic equivalent circuit diagram in FIGS. 7 to 9.

First, a voltage is applied to the appropriate gate line $G_n$ in order to turn on a channel FET for the pixel, as shown in FIG. 13. The voltage to be applied to the gate line must be at least $V_t$ higher than the source voltage $V_{in}$ to be written, and is typically 10V. At the same time, the voltage is applied to the adjacent gate line $G_{n+1}$ to turn on the FET for the variable capacitor. Here, let the capacitance of the pixel capacitor be $C_{const}$=1pF and the maximum capacitance of the variable capacitor be $C_{max}$=1pF, and the charge $Q_{pixel}$ stored at this point is calculated using the Equation 1. For a write voltage $V_{in}$=6V, the charge is derived as $Q_{pixel}$=1•6+1•(6−10)=2pC. Similarly, for a write voltage $V_{in}$=8V, $Q_{pixel}$=1•8+1•(8−10)=6pC.

After the write operation completes, the voltage on the gate line $G_n$ is lowered back to 0V in order to turn off the FET for the pixel. The charge $Q_{pixel}$ held remains the same. After that, the FET for the variable capacitor is also turned off, as shown in FIG. 15. Then, because the voltage is no longer applied to the variable capacitor, the variable capacitance value becomes $C_{min}$ due to its dependency on voltage. The charge applied between the gate and the channel of the FET for the variable capacitor is discharged to the source of the FET, thus, the potential of the source is affected. This is because the held capacitance as a whole becomes small while the stored charge is constant.

Let $C_{min}$=0, and $Q_{pixel}=C_{const}$•$V_{pixel}$($C_{const}$=1) is derived from Equation 2. For write voltage $V_{in}$=6V, $V_{pixel}$=2V is given, and for write voltage $V_{in}$=8V, $V_{pixel}$=6V is given.

Figure 16:
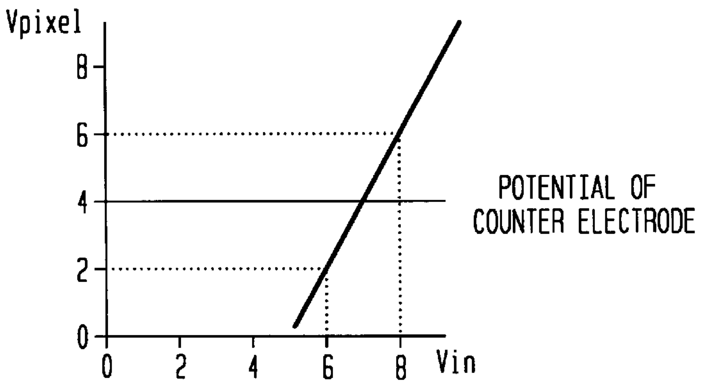
FIG. 16 is a diagram showing the amplification characteristic of the liquid crystal cell according to the subject invention.

FIG. 16 shows a plot of the above-mentioned relationship. The Y-axis represents output voltage $V_{pixel}$ and the Y-axis represents source voltage (input voltage) $V_{in}$ changes 6V to 8V. The difference of 2V in the write voltage provided from the source driver appears as the output difference of 4V, which is held in the pixel. That is, the liquid crystal cell of the subject invention amplifies an input voltage and outputs the resulting voltage. Thus, a voltage change with a large amplitude can be caused in driving the liquid crystal cell by using a driver which has a relatively small amplitude according to the subject invention. Furthermore, if the voltage of a counter electrode is retained at a median value of the output voltages as shown in FIG. 16, the liquid crystal can be driven without inverting the voltage of the counter electrode.

The structure of the subject invention can be implemented using known semiconductor manufacturing technologies. For example, the embodiment in FIG. 11 may be fabricated by forming polysilicon and aluminum layers as wiring layers. That is, a polysilicon layer is used for the gate line and an aluminum layer is used for the source line, therefore, the wiring shown in FIG. 11 can be implemented by a typical MOS semiconductor process. Then, the diffusion area 13 is formed in a known manner.

Figure 17:
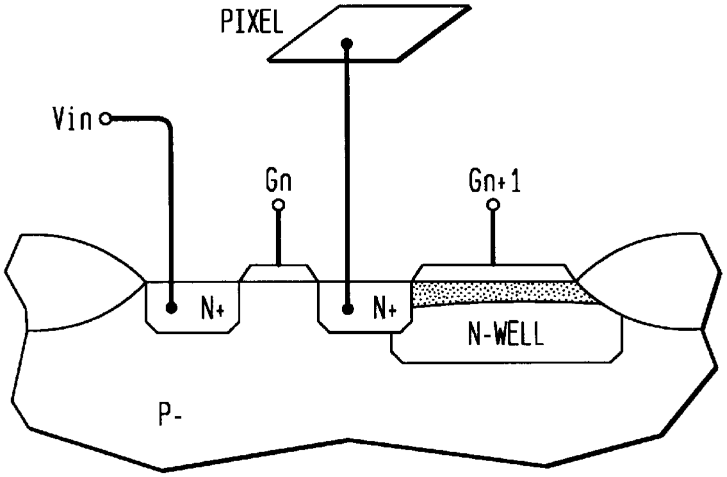
FIG. 17 is a cross-sectional view of another example of a liquid crystal cell and its driving circuit according to the subject invention.

FIG. 17 shows an example which uses a capacitance between a gate and an N-well isolated thin oxide film as a variable capacitor. Compared with an N channel FET, the N-well provides a nonlinear amplification. However, the nonlinearity can easily be corrected, for example, at the same time when nonlinearity of the voltage-transmittance of liquid crystal is corrected (gamma correction).

Although an adjacent gate line is used as a connection line for driving the variable capacitor in the above-mentioned embodiment of the subject invention, a separate wiring layer may be formed to use as the connection line and separate driving power supply may be used to drive the capacitor, if there is space for such wiring.

While a p-type silicon semiconductor substrate is used in this embodiment, those skilled in the art may readily implement the idea of the subject invention by using an n-type silicon semiconductor substrate. Those skilled in the art may readily fabricate the structure of the subject invention by using a currently well-known method for manufacturing semiconductor devices.

In the description of the above embodiment, the subject invention has been disclosed on the assumption that the semiconductor device of the subject invention is used for a liquid crystal cell. However, the semiconductor device of the subject invention may be represented by an equivalent circuit which is much the same as a liquid crystal cell, and its driving circuit, and a DRAM cell. Therefore, the subject invention is not limited to a liquid crystal cell. If the semiconductor device of the subject invention is used for a DRAM cell, the time interval between refresh operations may be extended.

Figure 18:
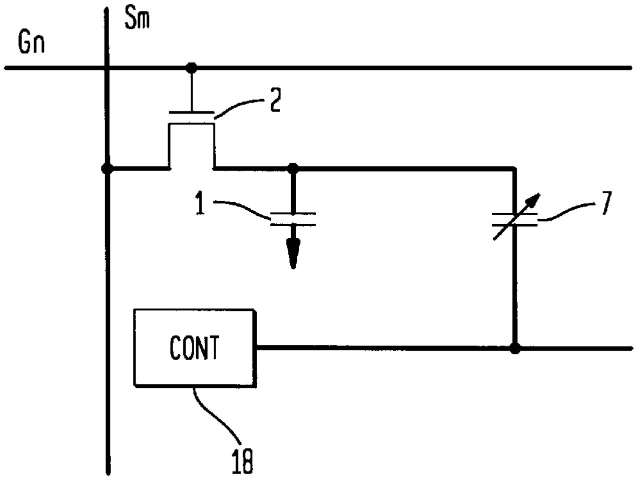
FIG. 18 shows an example of a semiconductor device of the subject invention which is used for a DRAM cell.

Referring to FIG. 18, a control means 18 for applying a voltage to a variable capacitor 7 is provided. A voltage applied to the variable capacitor 7 is controlled by this control means with a predetermined timing to lower the voltage to reduce the capacitance of the capacitor 7. Then charges move into a constant capacitor 1 which is a memory capacitor of the DRAM cell. Thus, when charge leaks from the memory capacitor, is replenished. By reducing the capacitance of the variable capacitor by degrees to replenish charges leaked from the memory capacitor 1 in this way, the time interval between refresh operations may be significantly increased compared with a conventional DRAM cell. A disadvantage of DRAMs is that they are not usable as SRAMs because they must be refreshed, therefore, it is very important to increase the time interval between refresh operations.

Figure 19:
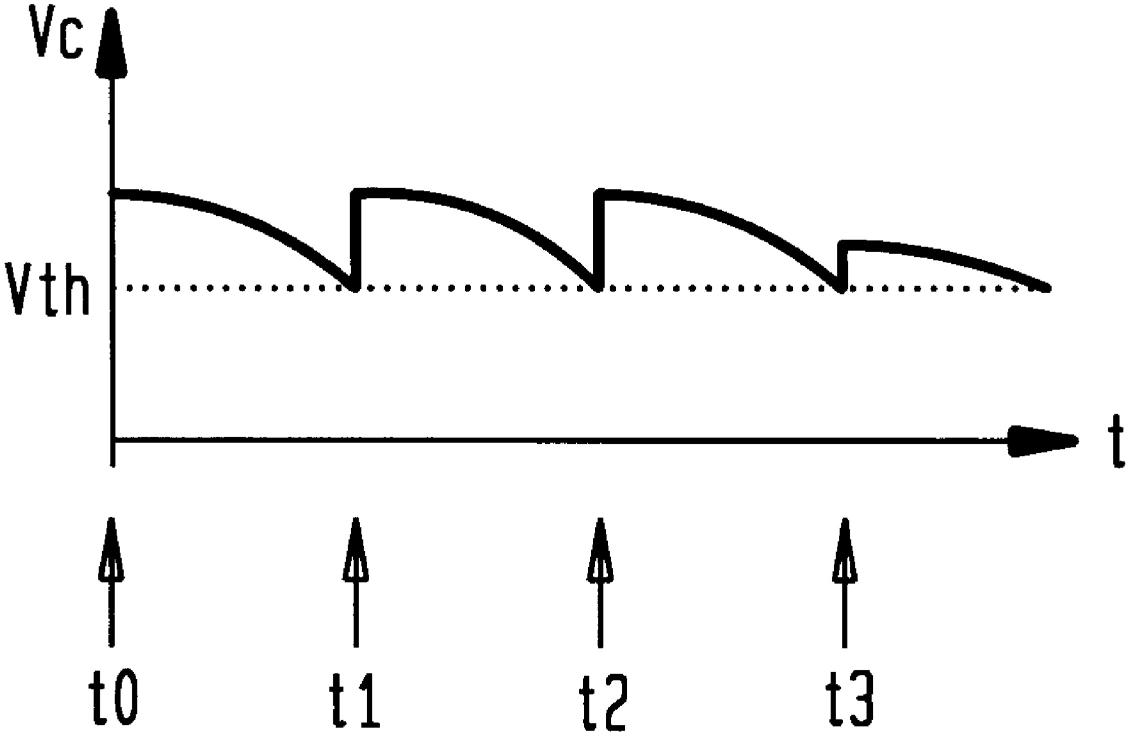
FIG. 19 is a timing diagram showing the refresh operation and control operation in the case where the semiconductor device of the subject invention is used in the DRAM cell.

FIG. 19 shows the timing for applying a voltage to the control means 18. In this diagram, the y-axis represents voltage $V_c$ across the constant capacitor 1 which corresponds to charge held in the constant capacitor 1, a DRAM cell. Whether data stored in the DRAM is "0" or "1" is determined by determining if the voltage is over a threshold $V_{th}$ or not. After the DRAM is refreshed at the time t0, $V_c$ decreases over time to approaches the threshold $V_{th}$. Conventional DRAMs must be refreshed again at this point $t_1$. In the semiconductor device of the subject invention, the control means 18 decreases voltage applied to the variable capacitor 7 at this point t1 to reduce its capacitance. Then the charges move to the constant capacitor 1, thus, the voltage $V_c$ of the constant capacitor is recovered at this point. Similarly, the voltage $V_c$ is recovered by the control means 18 at time $t_2$. However, when the variable capacitor 7 becomes empty of charge, the control means 18 cannot recover the voltage. Only at that point, the DRAM cell requires to be refreshed. This point of time is indicated by time $t_3$. At time $t_3$, the variable capacitor 7 no longer contains charge, therefore the voltage of the constant capacitor cannot be recovered by controlling the voltage applied to the variable capacitor 7 with the control means 18.

As described above, the time interval between refresh operations is increased several-fold compared with a conventional DRAM cell by using the semiconductor device of the subject invention for a DRAM cell.

The subject invention allows a liquid crystal cell to be driven by a sufficient alternating potential by using a low withstand voltage driver while retaining the potential of a counter electrode at a constant level. Consequently, the liquid crystal cell of the subject invention does not require a high voltage driver and allows the use of a driver which is inexpensive and capable of fast operation. Furthermore, the cell can be effectively driven by a low withstand voltage driver in counter electrode non-inverting mode by using the cell having the amplification function of the subject invention therein. Consequently, the need for wiring for an auxiliary capacitor or the like is eliminated. Thus, the device of the subject invention can keep up with the reduction of pixel size.

We claim:

1. A liquid crystal display containing a plurality of pixel elements and gate and drive lines, wherein each pixel element comprises:

a first gate line;

a source line;

a switching means connected to said source line for providing a voltage therefrom, said switching means being switched on an off by a voltage applied to the first gate line;

a pixel capacitor having a substantially constant capacitance connected to said source line via said switching means;

a second capacitor connected to said source line via said switching means in parallel with said pixel capacitor, the capacitance of said second capacitor being variable in response to voltage applied thereto; and a voltage applying means, independent of said first gate line and said source line, coupled to said second capacitor so that the capacitance of said second capacitor is first set to a high value to accumulate charge and then set to a low value to transfer the accumulated charge to the pixel capacitor by varying the voltage applied to the second capacitor by said voltage applying means.

2. The liquid crystal display of claim 1, wherein said voltage applying means includes a second gate line different from said first gate line.

3. The liquid crystal display of claim 2, wherein said voltage applying means is for reducing said variable capacitance according to leakage of charge stored in said pixel capacitor.

4. The liquid crystal display of claim 1, wherein said pixel capacitor comprises a structure containing liquid crystal sealed between electrodes functioning as plates of the pixel capacitor.

5. A method of providing a voltage multiplication function to a semiconductor device in a matrix of a plurality of such devices formed on a common substrate, said semiconductor device having a first gate line running in a first direction; source line running in a second direction different from the first direction; a switching means connected to said source lines for providing a voltage therefrom, said switching means being switched on and off by a voltage applied to the first gate line; and a first capacitor having a constant capacitance connected to said source line via said switching means, said method comprising;

a) providing a second capacitor having a variable capacitance connected to said source line via said switching means in a manner parallel to said first capacitor, said second capacitor being connected to a voltage applying means different from said first gate line and said source line, the capacitance of said second capacitor being variable according to the voltage applied thereto:

b) turning on said switching device to supply a voltage from said source line to said constant capacitor and said variable capacitor after said variable capacitor is set to a first value by applying a first voltage applied thereto;

c) thereafter turning off said switching device; and d) applying a second voltage to said variable capacitor to set capacitance of said variable capacitor to a second value which is lower than said first value.

6. The method of providing the voltage multiplication function of claim 5, including providing as said voltage applying means a second gate line different from said first gate line, and in step (b) activating said first gate line and said second gate line at approximately the same time.

7. A matrix of semiconductor devices, formed on a common semiconductor substrate, wherein each semiconductor device comprises:

a first gate line;

a source line;

a switching means connected to said source line for providing a voltage therefrom, said switching means being switched on and off by a voltage applied to the first gate line;

a first capacitor having a constant capacitance connected to said source line via said switching means;

a second capacitor connected to said source line via said switching means in parallel with said first capacitor, the capacitance of said second capacitor being variable in response to voltage applied thereto; and a voltage applying means, independent of said first gate line and said source line, coupled to said second capacitor so that the capacitance of said second capacitor can be first increased and then decreased according to the voltage applied thereto by said voltage applying means to first accumulate and then transfer charge from the second capacitor to the first capacitor.

8. The matrix of semiconductor devices of claim 7, wherein said voltage applying means includes a second gate line different from said first gate line.

9. The matrix of semiconductor devices of claim 8, wherein said voltage applying means is for reducing said variable capacitance according to the leakage of charge stored in said pixel capacitor.

10. The matrix of semiconductor devices of claim 7, wherein said first capacitor comprises a structure in which liquid crystal is sealed in between electrodes which are opposed to each other.

11. A liquid crystal display containing a plurality of pixel elements and gate and drive lines, wherein each pixel element comprises:

a first gate line;

a source line;

a switching transistor connected to said source line for providing a voltage therefrom, said switching means being switched on an off by a voltage applied to its gate through the first gate line;

a pixel capacitor having a substantially constant capacitance connected to said source line through said switching means to be charged through a path including the source line and the switching transistor when the switching transistor is conductive;

a second capacitor connected at one end to said source line via said switching transistor in parallel with said pixel capacitor to be charged along with the pixel capacitor, the capacitance of said second capacitor being variable in response to voltage applied thereto;

a voltage control circuit for the second capacitor, independent of said first gate line and said source line, coupled to the other end of said second capacitor so that the voltage applied to said second capacitor is varied independently of the switching transistor to set the capacitance of the second capacitor to a high level while the capacitors are being charged to accumulate charge in the second capacitor and then to a lower level when the switching transistor is turned off to transfer charge to the pixel capacitor to increase the voltage supplied to the pixel capacitor.

12. The liquid crystal display of claim 11, wherein said voltage control circuit includes a second gate line different from said first gate line.

13. The liquid crystal display of claim 12, wherein said voltage control circuit reduces the voltage applied to the second capacitor after the switching transistor is turned off.

14. The liquid crystal display of claim 11, wherein said pixel capacitor comprises a structure containing liquid crystal sealed between electrodes functioning as plates of the pixel capacitor.

* * * * *